March 25, 1958
R. E. ISENBERGER
2,828,089
WIRE REEL SUPPORT
Filed March 11, 1955
2 Sheets-Sheet 1
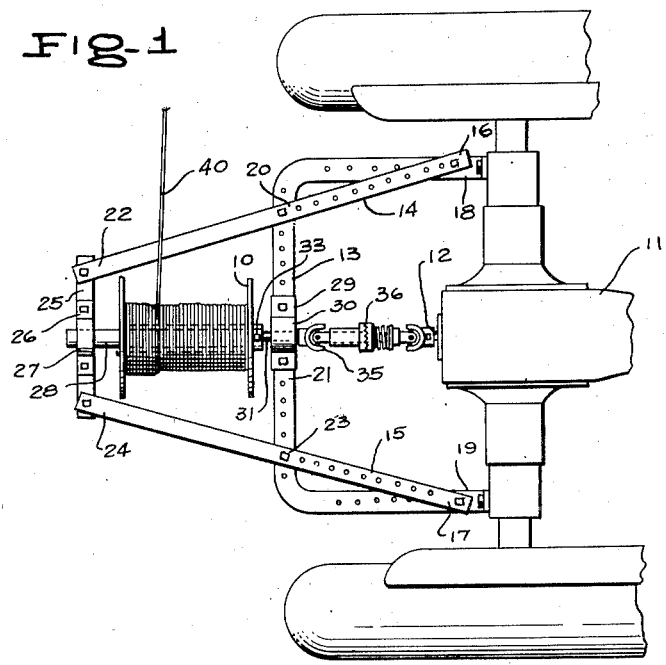
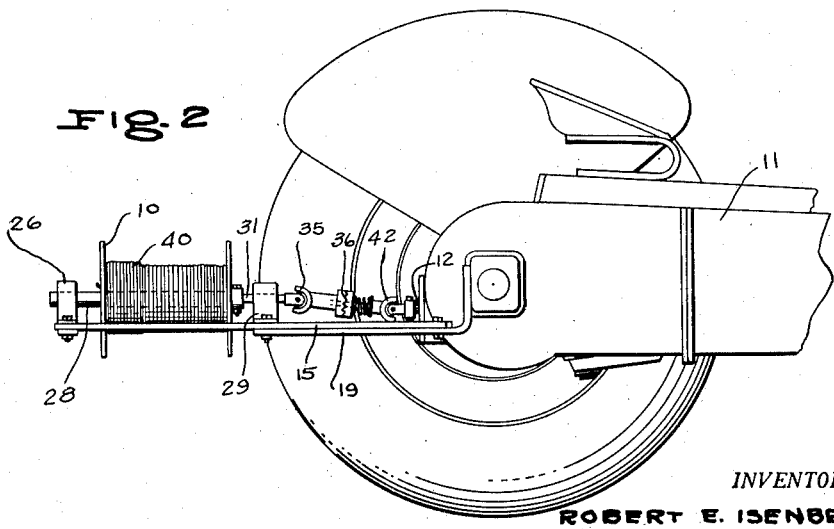
INVENTOR.
ROBERT E. ISENBERGER
BY
McMorrow, Berman + Davidson
ATTORNEYS

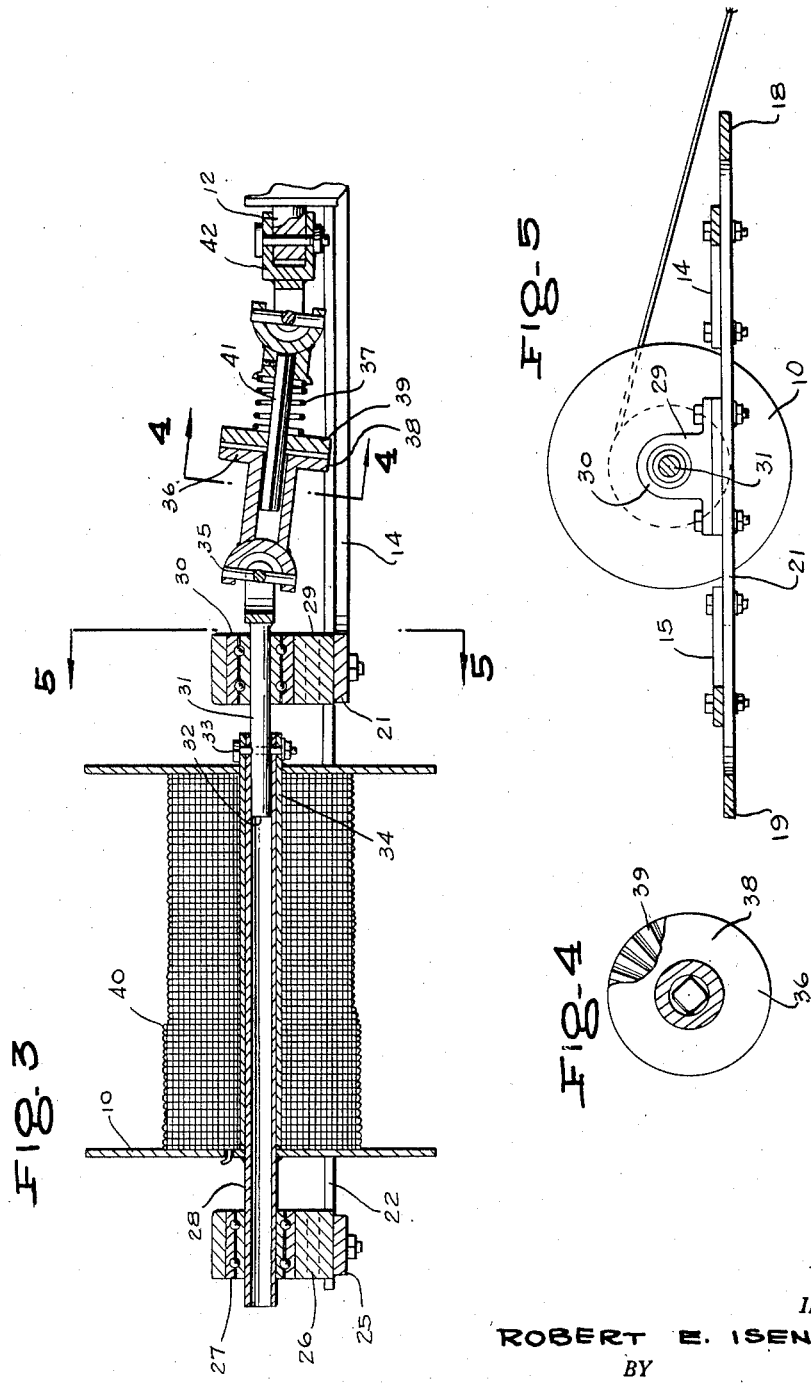

United States Patent Office 2,828,089
Patented Mar. 25, 1958

2,828,089

WIRE REEL SUPPORT

Robert E. Isenberger, Gillette, Wyo.

Application March 11, 1955, Serial No. 493,803

4 Claims. (Cl. 242—86.5)

The present invention relates to a tractor supported reel for wire rotated by the motive power of the tractor.

The principal object of the present invention is to provide a reel support and a drive mechanism for rotating the reel for attachment to a tractor having a power takeoff.

Another object of the present invention is to provide a reel support and a drive mechanism for rotating the reel of sturdy construction, one readily assembled on the tractor and readily connected to the power takeoff of the tractor.

A further object is to provide a reel support and drive mechanism for rotating the reel which is simple in structure, one economical to manufacture, and one highly effective in action.

These and other objects and advantages of the present invention will be fully apparent from the following description when taken in connection with the annexed drawings, in which:

Figure 1 is a top plan view of the reel support of the present invention showing it attached to the horizontal drawbar of a tractor, the tractor being shown partially broken away, Figure 2 is a side view in elevation of the reel support of the present invention as attached to the drawbar of a tractor, Figure 3 is an elevational side view in cross section of the reel support and drive mechanism of the present invention, Figure 4 is an end view partially in cross section on the line 4—4 of Figure 3, and Figure 5 is another end view partially in cross section on the line 5—5 of Figure 3.

Referring in greater detail to the drawings, in which like numerals indicate like parts throughout the several views, the present invention consists of a reel support and drive mechanism for a wire spool or reel 10 for use on a tractor 11 having a power takeoff 12 and a horizontally disposed U-shaped drawbar 13. The reel support includes a pair of horizontally disposed bars 14 and 15 having their adjacent one ends 16 and 17, respectively, arranged in superimposed abutting relation with respect to the adjacent end portions of the legs 18 and 19 respectively of the drawbar 13. The bar ends 16 and 17 are bolted or otherwise secured to the legs 18 and 19, respectively.

An intermediate portion 20 of the bar 14 is disposed in superimposed intersecting relation with respect to the bight 21 of the drawbar 13 and has its other end 22 projecting rearwardly of the drawbar 13. The bar 15 has a similar intermediate portion 23 disposed in superimposed intersecting relation with respect to the bight 21 of the drawbar 13 and also has its other end 24 projecting rearwardly of the drawbar. The ends 22 and 24 of the bars 14 and 15, respectively, converge toward each other and are connected by an end member 25.

A pillow block 26 is carried on the end member 25 and supports a bearing 27 in which is rotatably carried a reel shaft 28 arranged longitudinally with respect to the tractor 11. A second pillow block 29 is carried on the bight 21 of the drawbar 13 intermediate the legs 18 and 19 and has a bearing 30 carried thereon supporting a shaft 31 intermediate the ends of the latter.

The shaft 31 has one end 32 received within the reel shaft 28, both the shaft 31 and the reel shaft 28 being provided with a hole to receive a bolt 33, the reel 10 also being provided with a core 34 which projects at one end and is drilled or slotted so that the bolt 33 serves to connect the reel core 34 to the reel shaft 28 and to the shaft 31.

The other end of the shaft 31 is connected to a universal joint member 35 which is attached to one side of a slip clutch 36 having a spring 37 holding a pair of abutting notched plates 38 and 39 normally in engagement with each other but permitting slippage of one plate upon the other should the wire 40 become entangled as it is wound upon the reel 10.

A square shaft 41 and another universal joint 42 connects the clutch 36 to the power takeoff 12, the bore of the plate 39 being square while the bore of the plate 38 is round.

The ends 16 and 17 of the bars 14 and 15, respectively, diverge from each other in order that the intermediate portions of the bars 14 and 15 may intersect and be bolted to the bight 21 of the drawbar 13. This provides a readily attachable and assembled support for the reel 10 so that long lengths of wire 40 may be wound upon the reel for storage or reuse.

In use, the tractor is positioned transversely with respect to the length of wire to be wound, and at a slight angle so that the wire 40 tends to wind upon the forward end of the reel 10. A bar having one end driven into the ground may be used to force the wire to wind upon the reel as the tractor motor drives the power takeoff in even rows from the forward end of the reel to the rear end of the reel.

When it is desired to remove the reel from the tractor, the bolt 33 is removed from the reel core 34 and shaft 31 and the shaft 28 is pulled rearwardly, permitting the reel to drop from between the bars 14 and 15.

What is claimed is:

1. For use with a tractor having a horizontally disposed drawbar and a power takeoff, a reel support assembly comprising a pair of horizontally disposed bars arranged longitudinally of said drawbar with adjacent one ends contiguous to said drawbar and the adjacent other ends exteriorly of and spaced from said drawbar, said bars being detachably connected to said drawbar, spaced bearing means positioned longitudinally of and between said bars, each of said bearing means being connected to said drawbar, a horizontally disposed shaft rotatably supported in said bearing means for supporting a reel for rotary movement therewith, and coupling means operatively connected to said shaft and connected to the tractor power takeoff.

2. For use with a tractor having a horizontally disposed U-shaped drawbar and a power takeoff, a reel support assembly comprising a pair of horizontally disposed bars arranged longitudinally of said drawbar with adjacent one ends contiguous to the legs of said drawbar and the adjacent other ends exteriorly of and spaced from the bight of said drawbar, the adjacent one ends of the legs of said drawbar being detachably connected to the latter legs, an end member connecting said other adjacent ends together, bearing means connected to the bight of said drawbar, a horizontally disposed shaft rotatably supported on said end member and said bearing means for supporting a reel for rotary movement therewith, and coupling means operatively connected to said shaft and connected to the tractor power takeoff.

3. For use with a tractor having a horizontal U-shaped drawbar and a power takeoff, a reel support assembly comprising a pair of horizontally disposed bars arranged longitudinally of said drawbar with adjacent one ends contiguous to the legs of said drawbar and the adjacent other ends exteriorly of and spaced from the bight of said drawbar, the adjacent one ends of the legs of said drawbar being detachably connected to the latter legs, an end member connecting said other adjacent ends together, bearing means connected to the bight of said drawbar, a horizontally disposed shaft having one end rotatably supported on said end member for supporting a reel for rotary movement therewith, a second shaft rotatably supported intermediate its ends and said bearing means and having one end operatively connected to the other end of said first-named shaft for support and rotation of the latter, and coupling means operatively connected to the other end of said second-named shaft and connected to the tractor takeoff.

4. For use with a tractor having a horizontal U-shaped drawbar and a power takeoff, a reel support assembly comprising a pair of horizontally disposed bars arranged longitudinally of said drawbar with adjacent one ends contiguous to the legs of said drawbar and the adjacent other ends exteriorly of and spaced from the bight of said drawbar, the adjacent one ends of the legs of said drawbar being detachably connected to the latter legs, an end member connecting said other adjacent ends together, bearing means connected to the bight of said drawbar, a horizontally disposed shaft having one end rotatably supported on said end member for supporting a reel for rotary movement therewith, a second shaft rotatably supported intermediate its ends and said bearing means and having one end operatively connected to the other end of said first-named shaft for support and rotation of the latter, and coupling means operatively connected to the other end of said second-named shaft and connected to the tractor takeoff, said coupling means including a slip clutch assembly.

References Cited in the file of this patent

UNITED STATES PATENTS

| | | |
|---|---|---|
| 1,138,940 | Dooley | May 11, 1915 |
| 1,334,361 | Elsinger et al. | Mar. 23, 1920 |
| 2,171,034 | Kriegbaum et al. | Aug. 29, 1939 |